United States Patent [19]

Pratolongo

[11] 3,944,678
[45] Mar. 16, 1976

[54] PROCESS FOR THE FAST COOKING OF METERED QUANTITIES OF FOODSTUFF

[75] Inventor: Modesto Pratolongo, Milan, Italy

[73] Assignee: Santa Martha Bay Shipping and Trading Co., Ltd., Curacao, Netherlands Antilles

[22] Filed: May 9, 1974

[21] Appl. No.: 468,561

Related U.S. Application Data

[62] Division of Ser. No. 289,941, Sept. 18, 1972, Pat. No. 3,227,344.

[30] Foreign Application Priority Data

Oct. 9, 1971 Italy ................................. 29724/71
Oct. 9, 1971 Italy ................................. 29725/71
Oct. 9, 1971 Italy ................................. 29726/71

[52] U.S. Cl. ............................ 426/508; 426/509
[51] Int. Cl.² ..................................... A23L 1/00
[58] Field of Search ........... 426/343, 352, 496, 508, 426/509, 478, 486, 557, 618, 472; 99/355

[56] References Cited
UNITED STATES PATENTS

| | | | |
|---|---|---|---|
| 1,374,340 | 4/1921 | Vaudreuil | 99/355 |
| 1,488,252 | 3/1924 | House | 426/496 X |
| 2,194,107 | 3/1940 | Williams | 426/496 |
| 2,490,431 | 12/1949 | Greene et al. | 426/472 X |
| 2,803,545 | 8/1957 | Randolph | 426/472 X |
| 3,809,777 | 5/1974 | Thompson | 426/509 X |

FOREIGN PATENTS OR APPLICATIONS

| | | | |
|---|---|---|---|
| 866,172 | 4/1961 | United Kingdom | 426/472 |

*Primary Examiner*—S. Leon Bashore
*Assistant Examiner*—Arthur L. Corbin
*Attorney, Agent, or Firm*—Harold L. Stowell

[57] ABSTRACT

A process for cooking quantities of foodstuffs comprises introduction of food and water into a pressurized cooking chamber where the food is cooked under pressure at temperatures of over 100°C. The cooked food is then conveyed into a centrifugal separator wherein excess cooking water and its vapour are removed from the cooked food by subjecting the cooked food to centrifugal force.

6 Claims, 8 Drawing Figures

PROCESS FOR THE FAST COOKING OF METERED QUANTITIES OF FOODSTUFF

This is a division, of application Ser. No. 289,941, filed Sept. 18, 1972, now U.S. Pat. No. 3,227,344.

This invention relates to apparatus for the quick and controlled cooking in hot water of metered quantities of foodstuffs, such as rice, noodles, spaghetti and the like.

An object of the invention is to achieve metering and quick cooking of foodstuffs, as well as distribution of the cooked food to consumers, for example in vending machines.

It is particularly important to cook foods for self-distribution within a very short period. Therefore it is necessary to reduce the so-called "technical times", such as required to introduce the raw product into a cooking vessel and to unload the cooked product from said vessel, to close and to open said vessel, to allow water to drain off the cooked food and to separate it from the cooking liquid, as opposed to the real cooking time of the foodstuff.

Another object of the invention is to provide for dressing of the cooked food immediately following the cooking operation, to maintain a quantity of water in the food.

Still another object of the invention is to provide additives or dressings to the cooked food, in such a way as to admix said dressings thoroughly and evenly with the food.

The invention provides apparatus for cooking, in hot water, metered quantities of foodstuffs such as rice, noodles and the like, comprising a pressurized cooking chamber provided with means to maintain, in said chamber, pre-selected water pressures and temperatures, said chamber having openings for the introduction of raw foodstuff and for the extraction of cooked food respectively, the apparatus further comprising metering means for introducing raw foodstuffs to the cooking chamber; a hot water generator for boiling water to temperatures over 100°C the generator being connected to said cooking chamber, maintain food in the chamber submerged in hot water during a cooking operation, and centrifugal separating means connected to the extraction opening of the cooking chamber to receive cooked food from the chamber, separate cooking water therefrom and absorb kinetic energy developed by the food.

In particular, to cook filamentary material such as spaghetti and the like, the cooking chamber comprises a main chamber and an elongate pre-cooking chamber having a cross-section smaller than that of the main chamber. The invention will not be described by way of an example with reference to the accompanying drawings in which.

Figure 1:
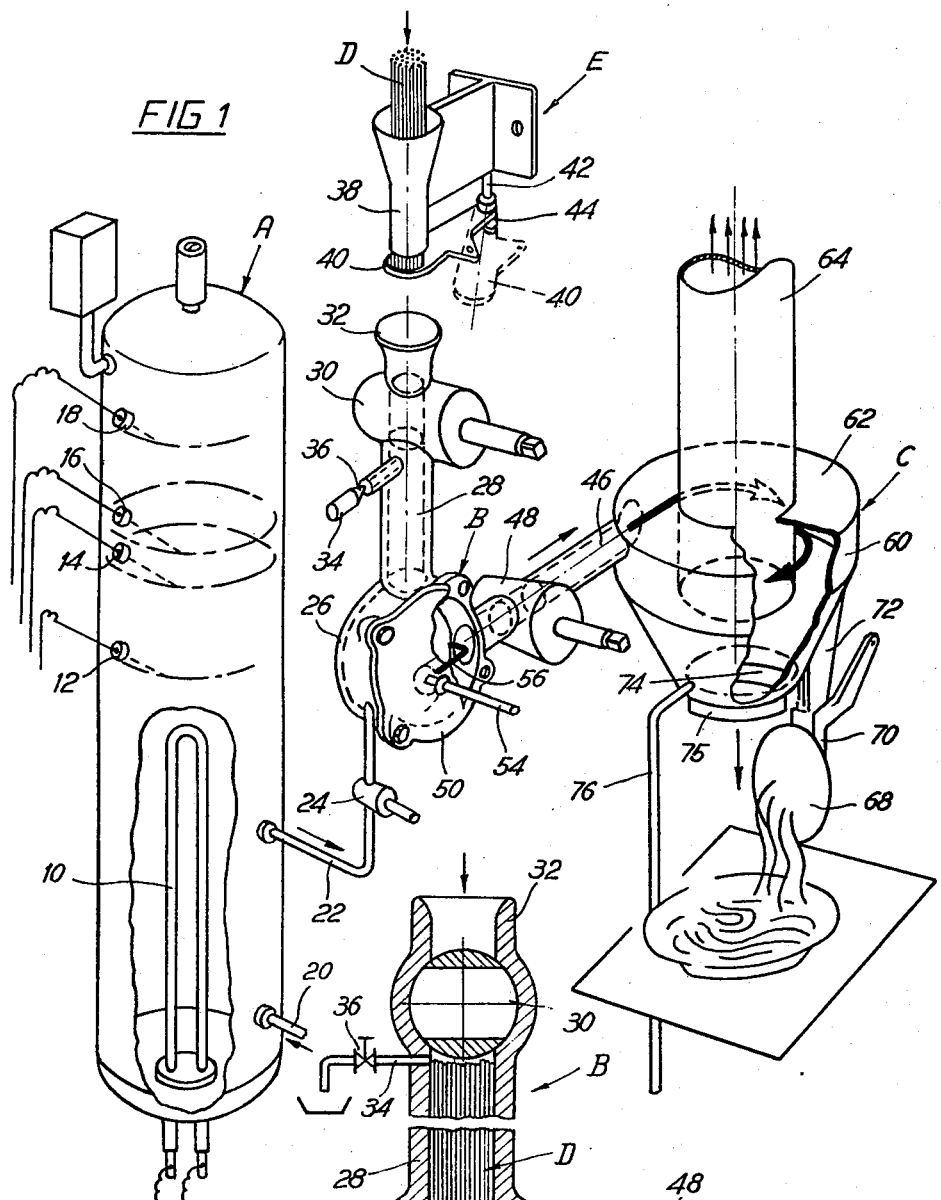
FIG. 1 is an isometric projection, with sectioned parts, of a cooking vessel and separating unit.
Figure 2:
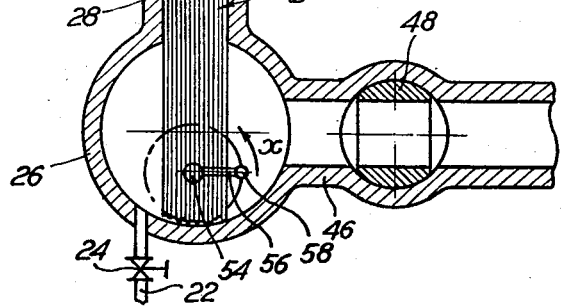
FIG. 2 is a vertical part-section of the cooking vessel.
Figure 3:
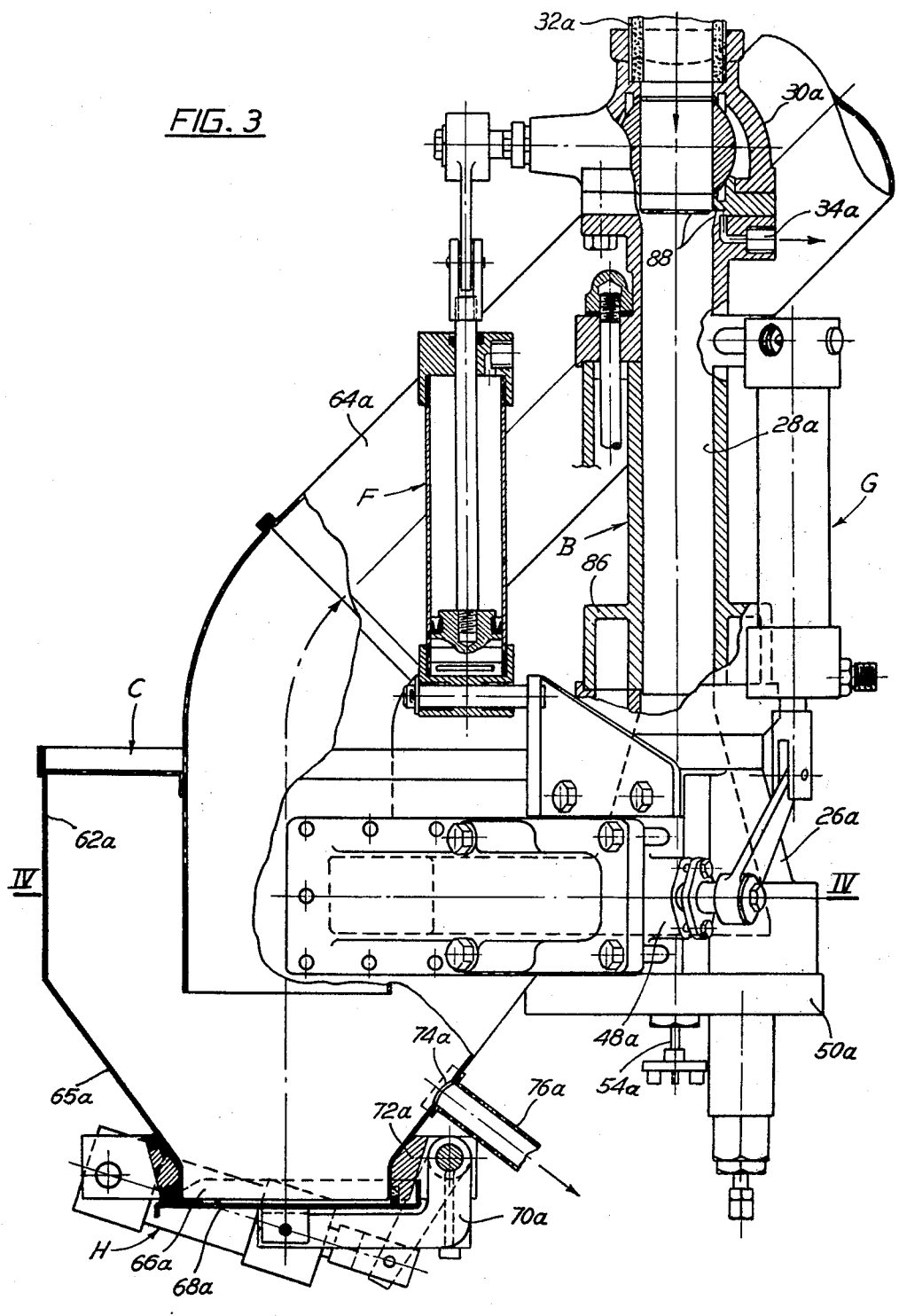
FIG. 3 is a cross-section through another form of cooking vessel.

Considering now FIGS. 1 and 2 of the drawings, the units shown comprise:

A boiler A to feed a cooking chamber B with pressurized hot water, the outlet of the container leading to a centrifugal separator C.

A heat generator 10 of boiler A, preferably of the electric type has at an upper part thereof, a plurality of probes, 12, 14, 16 and 18, the first and last of said probes providing for the control of the minimum and maximum water levels in the boiler. The intermediate probes 14 and 16 are designed to control the operation of a feed pump (not shown) attached to connection 20. The probes are connected to appropriate control apparatus to adjust the performance of the boiler, in such a way that the water supply to the boiler is independent from the extraction of hot water from the boiler.

Boiler A connects to cooking chamber B by means of a tube 22 provided with controlled obturating member 24, to perform a food cooking operation as will be described.

The cooking vessel B as shown in FIGS. 1 and 2 serves to cook or boil noodles and the like, such as, for instance, "spaghetti" said noodles being introduced into the vessel in the form of a metered bundle D.

Figure 6:
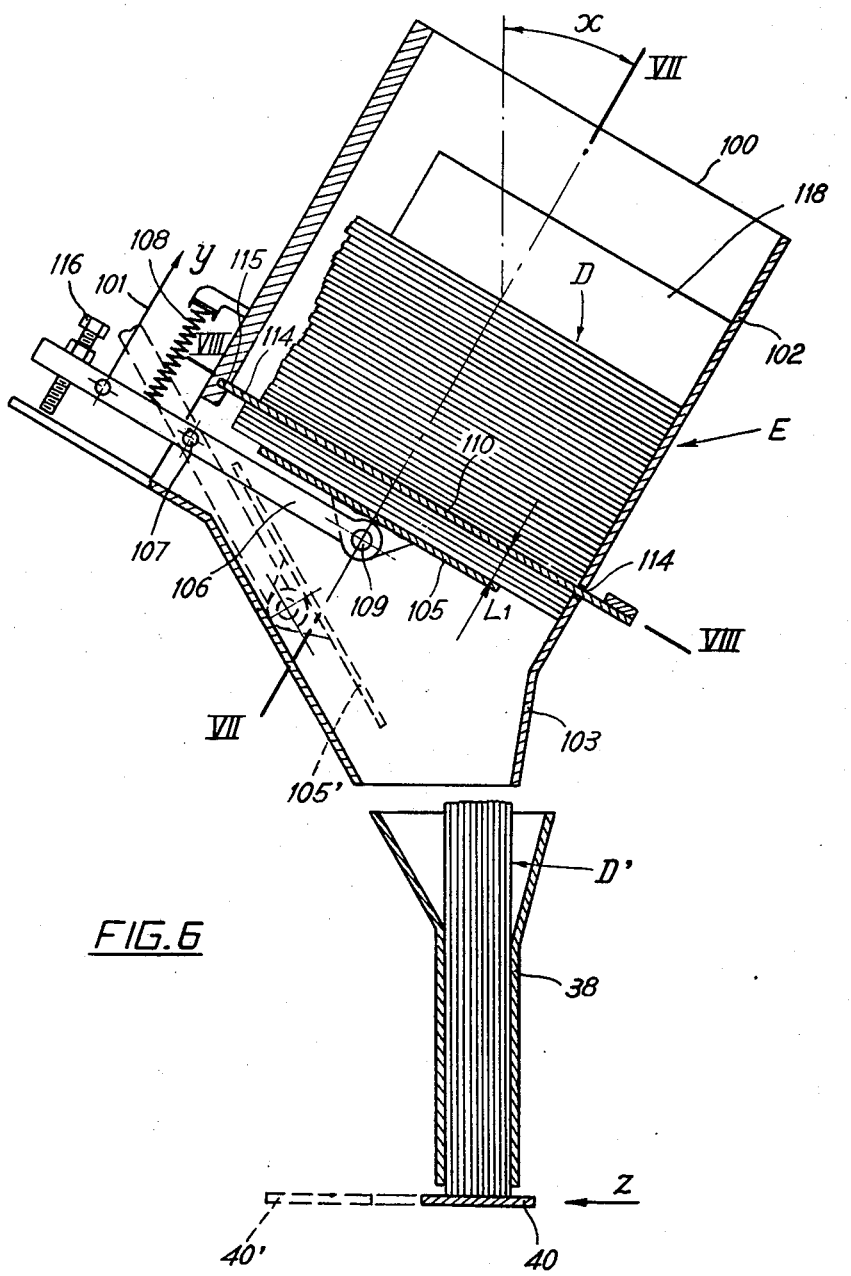
FIG. 6 is a vertical cross-section of a metering device for long noodles or spaghetti.
Figure 7:
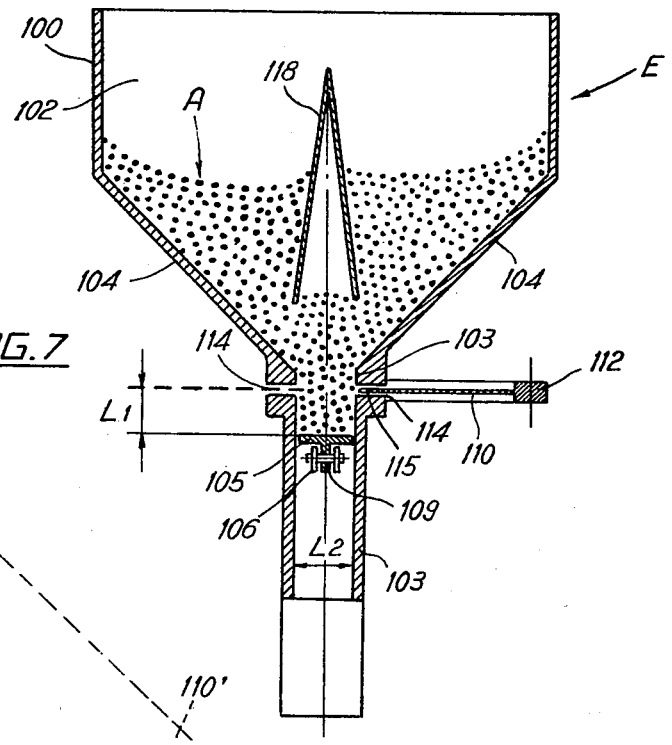
FIGS. 7 and 8 are cross-sections along lines VII — VII and VIII — VIII of FIG. 6 respectively.
Figure 8:
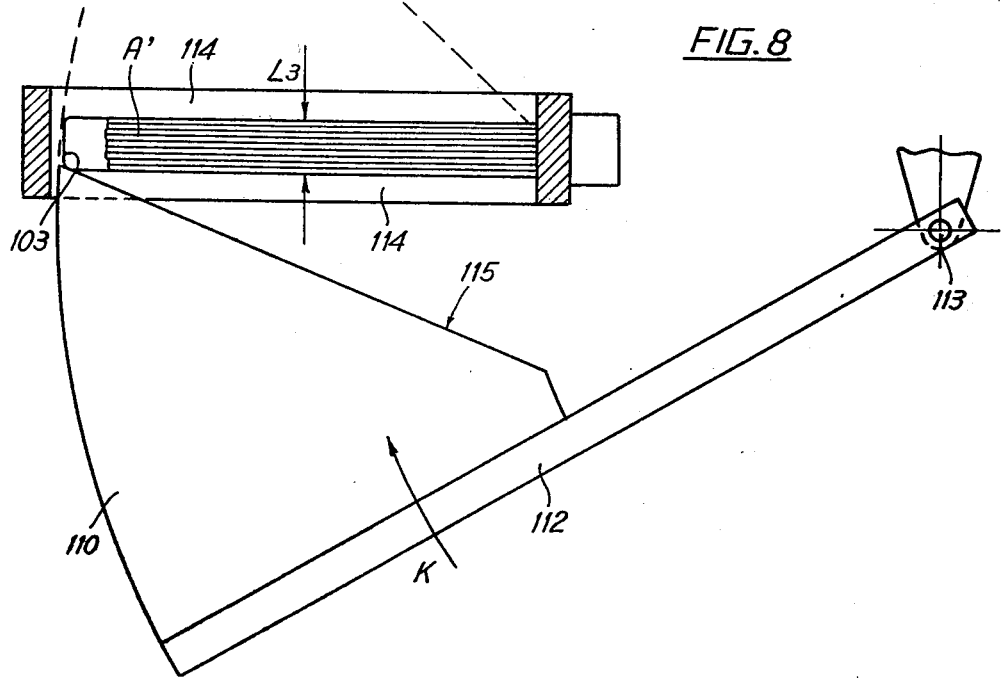

The vessel B comprises a cylindrical chamber 26 having the desired capacity, connected, at the upper end thereof, to a cylindrically shaped pre-cooking chamber 28, having a smaller diameter than that of chamber 26, the axis of said pre-cooking chamber being perpendicular to the axis of chamber 26. The diameter, and length of pre-cooking chamber 28 are substantially the same as those of the food bundle D. The top of pre-cooking chamber 28 is closed by means of an obturating member 30 provided with feed hopper or feed box 32 for the raw material D. Further, pre-cooking chamber 28 has towards its upper end and next to obturating member 30, a duct 34 provided with a pin valve 36 to control communication between pre-cooking chamber and the atmosphere. The loading hopper or feed box 32 is situated below and in alignment with a container 38, the bottom of which has a swinging plate 40 integral with a shaft 42 of a motor 44 and the upper part of said container is connected to the outlet of a volumetric metering device E, for example of the type as shown in FIGS. 6 – 8.

Cooking or boiling chamber 26 has, at the center thereof, a connection 45 for a duct 46 with an obturating member 48 to connect said chamber to a centrifugal separator C. Duct 46 can extend in any desired direction and it can have a length of up to 2 to 3 meters or more. Chamber 26 is closed by means of a cover 50 with a support 52 for a shaft 54, the axis of said shaft being displaced downwardly with respect to the axis of said chamber, said shaft firmly retaining a fork 56 with a roller 58 forming a mixer. Fork 56 is advantageously rotated in the direction of arrow X of FIG. 2 and the fork is so dimensioned that the cylindrical roller thereof 58 co-operates with the lower part of chamber 26.

The outlet tube 46 of cooking chamber B enters the upper part of the centrifugal separator C, the bottom of which is provided with a mouthpiece 66 equipped with a closing disc 68 and one or more drainage openings 74 are provided above said closing disc, said opening or openings each having an outlet tube 76.

Figure 4:
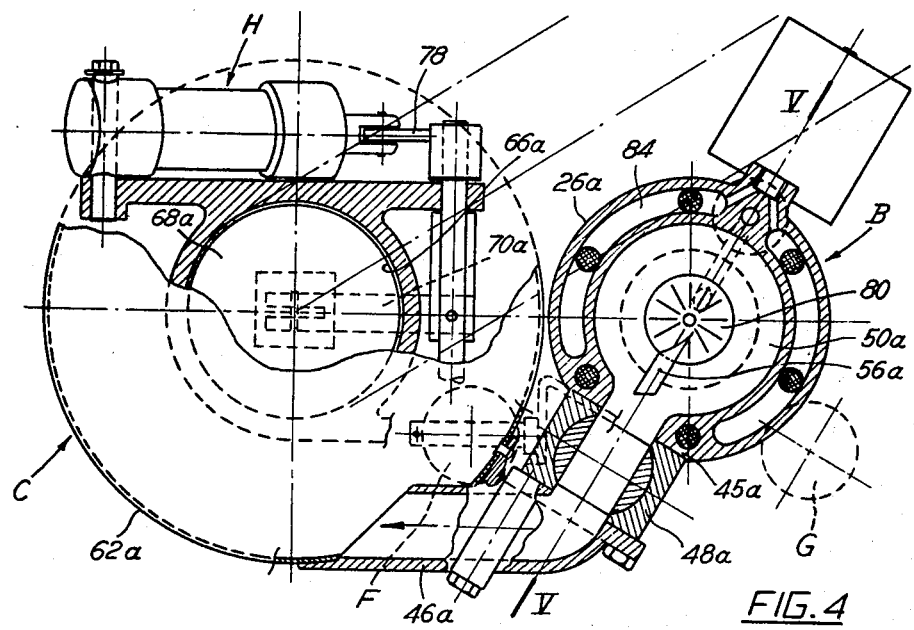
FIGS. 4 and 5 are sections, along lines IV — IV of FIG. 3 and the lines V — V of FIG. 4 respectively.
Figure 5:
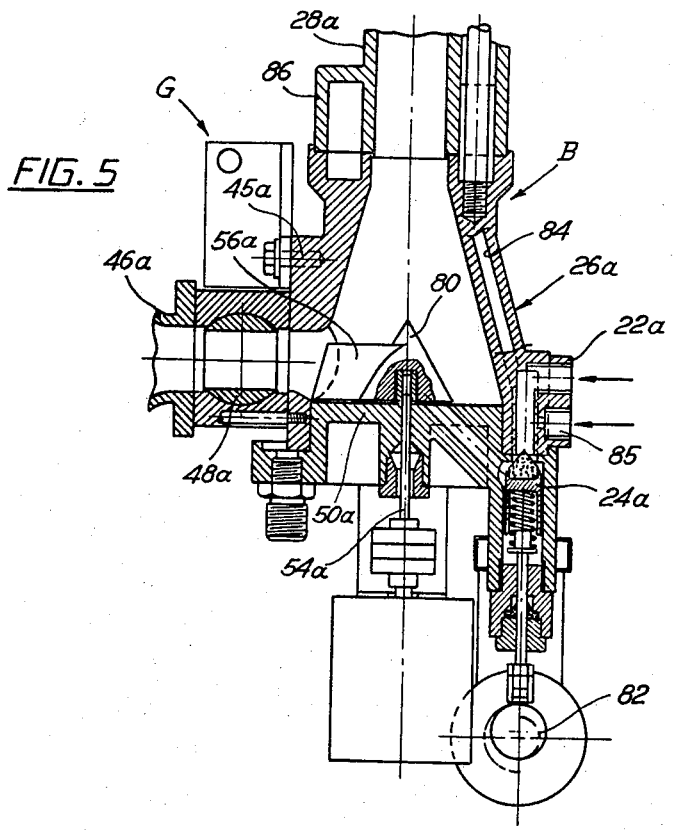

Considering now the alternate embodiment of the apparatus shown in FIGS. 4 and 5, the parts which are the same as or equivalent to those hereinbefore described are marked with the same reference numerals and said embodiment is provided with a fluid pressurized control or driving member to automate the above described apparatus.

In said alternate embodiment, the boiling or cooking vessel B has a pre-cooking chamber $28_a$ the lower part of which connects the cooking chamber $26_a$ having the shape of a truncated cone. The larger base of said cooking chamber $26_a$ faces downwardly and said chamber is closed by a cover $50_a$ which supports a shaft $54_a$ of a motor F, to drive a blade $56_a$. As shown in FIG. 5, blade $56_a$ is combined with a shifting cone 80, the walls of which are substantially parallel with the inner walls of chamber 26.

An obturating member $24_a$ is actuated by a cam 82, said cam being driven by a corresponding motor, for the gradual introduction of hot water into the pressurized vessel or chamber B.

Chambers $26_a$ and $28_a$ are provided with heating means for the controlled heating thereof, such means consisting, in the illustrated case, of spaces 84 and 86 surrounding the walls of said chamber.

During the cooking or boiling operation, the pressure in container B is controlled by a pin valve 36 which connects pre-cooking chamber 28 to the outlet through curved slits 88 provided in the upper wall of pre-cooking chamber 28, immediately below an obturating member $30_a$, in such a way that, due to the relatively wide passage provided by slit 88 and to the limited height of said slits, it is possible to release the excess of pressure of container B with limited speed, to prevent the cooked food from being entrained by the vapour.

The movable parts of obturating members $30_a$ and $48_a$ advantageously consist of pierced balls, to allow for the free passage of the cooked food, it being possible to actuate such balls by means of alternate motors F and G through controlled electric valves, automatically to actuate the operating cycle of the apparatus by means of a programmer.

Metering device E, shown in FIGS. 6, 7, 8, is particularly suitable for metering spaghetti or like filamentary foodstuffs and comprises a container 100 for the filamentary material D, which is deposited into said container with the axes thereof inclined by an angle X (for example of 30°) with respect to axis VIII — VIII of the container, in such a way that the filamentary elements D rest, with their ends, against wall 102 of said container, the elements being influenced by gravity, to move towards an outlet 103 of the container. The opening is provided at the bottom of container 100, the section of which is rectangular and the container connects, by means of said section, with two inclined downwardly converging outlet walls.

A stop 105 is provided in outlet 103, said stop being attached, through a pivot 109, to an arm 106, pivotally connected at 107, to the body of the container 100.

By means of a driving member 101, arm 106 is moved in the direction of arrow Y, in opposition to a return spring 108 in such a way that stop 105 moves down until reaching position 105, to allow the discharge of a bundle of the filamentary material D held between the stop on a metering blade 110 into a collecting container 38 so that the individual elements of the filamentary material are disposed with their axes in a substantially vertical direction.

The transverse cross-section of the collecting container 38 is selected in accordance with the requirement to displace or to pack the cooked material.

As already mentioned with reference to the embodiment shown in FIGS. 1 and 2, plate 40 is inserted between the outlet opening of collecting container 38 and the feed hopper 32 and said plate is moved in the direction of arrow D, in order to discharge the metered material D into the cooking chamber situated below the container. The metered quantity of spaghetti D' which is delivered at each of the operations preformed by the plate, is determined by the position of blade 110 which is integral with a swinging arm 112 fulcrumed, at 113 to the body of the device. Blade 110 is constrained to slide in a slit 114 in the container 100 which is provided at a height $\Delta_1$ from stop 105.

If blade 110 is rotated in the direction of arrow K (toward position 116 shown in FIG. 8), said blade penetrates into material D, to meter a constant portion established by width $\Delta_2$ of mouth-piece 103, as well as by distance $\Delta_1$ between stop 105 and blade 110. The blade is designed to retain material D which is situated above it, during the opening of stop 105, i.e., during the discharge operation of the metered quantity $D_1$ which is then conveyed to collector 38. The width of slit 114 and of blade 110 should be less than one/half of the outer diameter of the individual spaghetti filaments, to prevent said filaments from wedging with each other.

The front edge 115 of blade 110 is preferably inclined with respect to the radial direction in such a way as to provide a permanent fit of the outermost part of the blade into slit 114 and the progressive outspreading of the spaghetti which is performed by said blade, in an inclined direction with respect to the axis of the spaghetti.

The metering operation is thus performed by alternate movements of the blade 110 and the stop 105.

The quantity of material which is extracted with each metering operation, can be varied, by changing, the height $\Delta_1$ by means of set screw 116 which moves the end-stroke position of stop 105.

Stop 105 is, orientated through pivot 109, so as to be perpendicular with the axis of material D when it drops into the outlet 103. Return-spring 108 can also operate as a damping means for the dropping material and/or to compensate possible irregularities during the performance of blade 110.

A stiff diaphragm 118 in the form of a wedge integral with container 100, co-operates in maintaining the spaghetti parallel to each other and parallel with the slide-walls, thus reducing the weight of the material situated above the metering areas.

In the operation of the apparatus, initially, the obturating members of the apparatus are in the following positions: obturating member 30 is open; pin-valve 36 is closed; obturating members 24 and 48 are closed; locking-disc 68 for the centrifugal separator C is closed; swinging blade 40 of container 38 is closed.

When spaghetti is to be cooked, it is metered and delivered by the metering device E, into container 38, where the spaghetti is retained by means of plate 40. Thereafter, the plate 40 is caused to move away from container 38, to allow the spaghetti-bundle drop into the cooking vessel B situated below the container. The drop of the raw material is damped by a water cushion, previously introduced; or by the amount of water which is left in chamber 26 after the performance of the preceding unloading operation. The obturating member 30 closes and cock 24 opens, to introduce a quantity of boiling water from boiler A, into chamber 26. To facilitate collection of the material in chamber 26 during the cooking step, a fork 56 is operated and then rotated during the entire cooking or boiling time. The stirring operation of the material which is performed during the cooking or boiling step also provides for expansion of the external layer and a quick soaking of said material, thus ensuring quick and uniform cooking thereof. Furthermore, the stirring operation of the material during the cooking stage is performed in counter-current with respect to the direction along which the material is loaded into and unloaded from container B, to ensure uniform cooking. During the softening and cooking stage of the food, valve 36 is actuated at intervals to release, from the pressurized vessel B, the excess of vapor, for the purpose of ensuring good cooking conditions in accordance with the quality of material to be cooked. The material is cooked in hot water, without coming into contact with the vapour, by maintaining, in vessel or container B, the necessary liquid level and by releasing, at regular intervals, the vapour which forms in said chamber, due to the stirring operation. When the spaghetti reaches the desired cooking degree, intercepting member 43 is quickly actuated, to connect the boiling or cooking vessel B with the centrifugal separator C. As said separator is charged by atmospheric pressure, whereas cooking or boiling vessel B is charged by a higher pressure (for instance of over 2 atm.), the cooked spaghetti and the cooking liquid are conveyed substantially instantaneously into duct 46 and then unloaded into the centrifugal separator C. To convey the cooked food from the pressurized vessel B into the centrifugal separator C, it is possible to use conveying ducts 46 of a certain length; or otherwise a limited cross-section, as the conveyance of said cooked material is, at any time, ensured by the pressure difference existing between the cooking chamber B and the centrifugal separator C.

The material delivered by duct 46 and which is unloaded in a tangential direction into the centrifugal separator, is centrifuged and, as it loses kinetic energy, it collects at the bottom of the centrifugal separator, whilst the vapour is released to the atmosphere through duct 64.

Since the pressure which prevails in the centrifugal separator C is reduced, parts of the hot water content of the cooked material is released, in such a way that the water content of the ready cooked material is low. Therefore, it would be also possible to pre-boil the food-stuffs which in this case would be collected by the centrifugal separator C in the absence or almost in the absence of water, as the cooking water is removed from the cooked or boiled material.

Chamber 60 of the centrifugal separator C allows the collection not only of the centrifuged and cooked material, but also a certain amount of the cooking liquid which is carried by the cooked food. If the cooked food is served immediately to the consumer, part of said liquid is preserved in the cooked food and the quantity of said liquid varies according to the position of drainage opening 74 in the wall of chamber 65 of the centrifugal separator, whereas the remaining liquid is drained off through duct 76. Finally, the cooked food is unloaded through discharge opening 68.

It is possible to modify the above-described cooking vessel, as well as the apparatus which incorporates said vessel according to the quality of food to be cooked. The cooking vessel can be maintained at required temperatures by circulating an appropriately heated fluid through the free spaces 84 and 86.

What we claim is:

1. A process for cooking foodstuffs from the group consisting of rice, noodles and spaghetti, comprising the steps of: introducing a metered quantity of the foodstuff into a cooking chamber having an inlet opening and an outlet opening, hermetically sealing the inlet opening and the outlet opening of said cooking chamber; introducing water under pressure at a temperature of over 100°C into the cooking chamber, extracting vapour from the cooking chamber by removing introduced water and foodstuffs through the outlet opening to obtain a rapid drop in pressure; and then removing excess water from the foodstuffs, removing vapour developed during the rapid drop in pressure from the foodstuffs and absorbing the kinetic energy developed in the foodstuffs during said removal from the cooking chamber by subjecting the foodstuffs to centrifugal force.

2. The process for cooking foodstuffs as defined in claim 1 wherein the centrifugal force imparts a rotary motion to the foodstuffs.

3. The process for cooking foodstuffs as defined in claim 2 wherein the rotary motion has an axis in a vertical plane.

4. The process defined in claim 1 including adding metered quantities of dressings to the foodstuffs.

5. A process for cooking raw filamentary spaghetti, comprising introducing a metered quantity of the raw spaghetti into an elongate cooking chamber having an inlet opening and an outlet opening, hermetically sealing the inlet opening and the outlet opening of said cooking chamber; introducing water under pressure at a temperature of over 100°C into the cooking chamber, stirring the spaghetti in the water while it is maintained in the cooking chamber, extracting vapour from the spaghetti by removing introduced water and the spaghetti through the outlet opening to obtain a rapid drop in pressure; and then removing excess introduced water from the spaghetti, removing vapour developed during the rapid drop in pressure from the spaghetti and absorbing the kinetic energy developed in the spaghetti during the removal thereof from the cooking chamber by subjecting the spaghetti to centrifugal force.

6. A process for cooking foodstuffs from the group consisting of rice, noodles and spaghetti, comprising introducing a metered quantity of the foodstuff into a cooking chamber having an inlet opening and an outlet opening, hermetically sealing the inlet opening and the outlet opening of said cooking chamber; introducing water under pressure and at a temperature of over 100°C into the cooking chamber, stirring the foodstuff in the introduced water, and then subjecting the foodstuff, introduced water and vapour formed therefrom to centrifugal force.

* * * * *